March 21, 1961 B. F. LATHAM, JR., ET AL 2,976,128
APPARATUS FOR MAKING CARBON BLACK
Filed Jan. 28, 1959 4 Sheets-Sheet 1
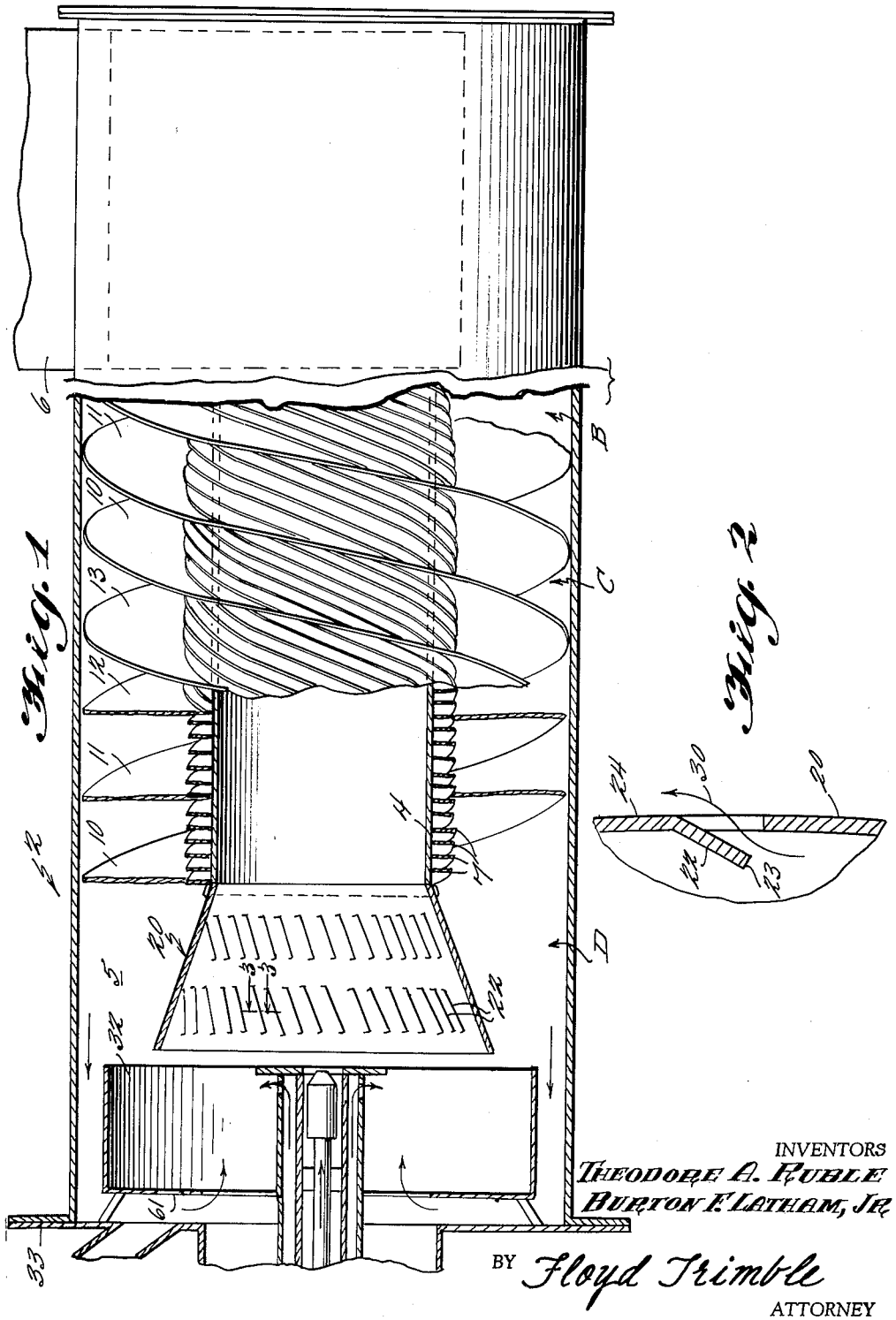
INVENTORS
THEODORE A. RUBLE
BURTON F. LATHAM, JR.
BY Floyd Trimble
ATTORNEY

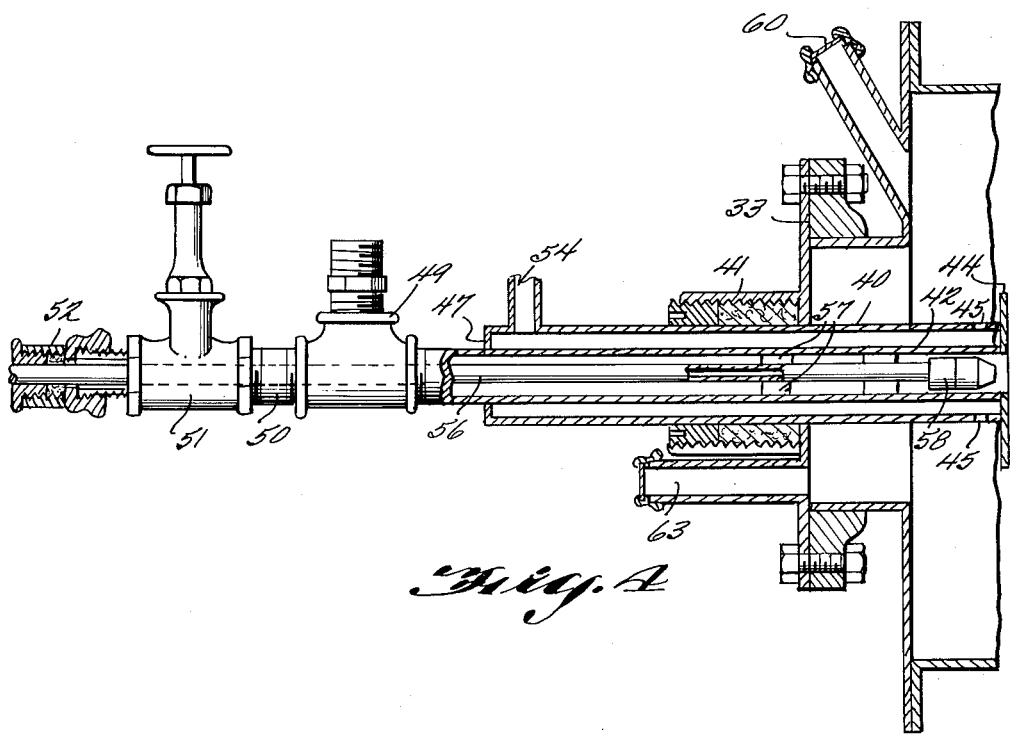

March 21, 1961 B. F. LATHAM, JR., ET AL 2,976,128
APPARATUS FOR MAKING CARBON BLACK
Filed Jan. 28, 1959 4 Sheets-Sheet 3

INVENTORS
THEODORE A. RUBLE
BURTON F. LATHAM, JR.
BY Floyd Trimble
ATTORNEY

March 21, 1961  B. F. LATHAM, JR., ET AL  2,976,128
APPARATUS FOR MAKING CARBON BLACK
Filed Jan. 28, 1959  4 Sheets-Sheet 4
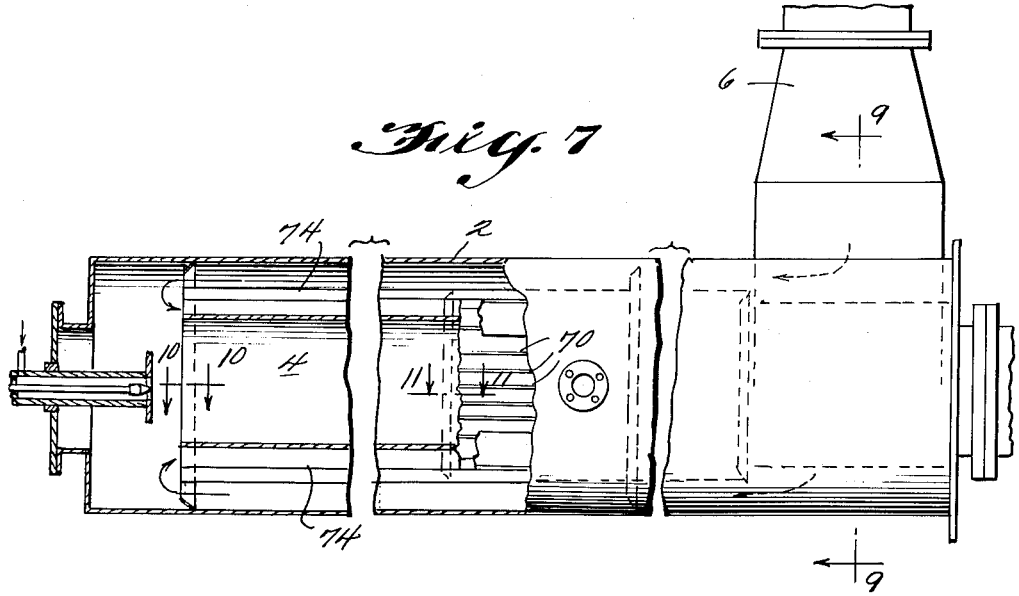
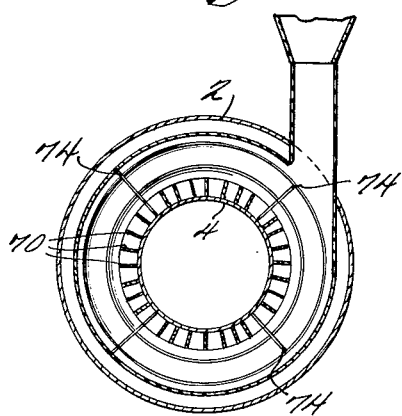
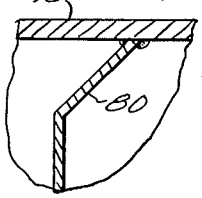
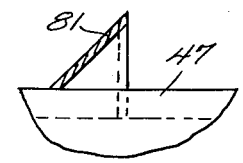
INVENTOR
THEODORE A. RUBLE
BURTON F. LATHAM, JR.
BY Floyd Trimble
ATTORNEY United States Patent Office 2,976,128
Patented Mar. 21, 1961

2,976,128
APPARATUS FOR MAKING CARBON BLACK

Burton F. Latham, Jr., and Theodore A. Ruble, Amarillo, Tex., assignors to Continental Carbon Company, Amarillo, Tex., a corporation of Delaware Filed Jan. 28, 1959, Ser. No. 789,714

7 Claims. (Cl. 23—259.5)

This invention relates to the manufacture of carbon black from petroleum oils, or any type hydrocarbon, such as shale oil, coal tar, etc.

In the art of making carbon black, it is generally known that a superior grade is obtained by rapidly cracking a finely divided hydrocarbon at a relatively high temperature in a turbulent atmosphere where the rate of heat transfer to the hydrocarbon is very rapid. It is also well known that, when preheated air is used, a higher yield is obtained due to the fact that a smaller portion of the hydrocabon has to be burned to heat the gases and remaining hydrocarbon up to the cracking temperature. The velocity of the gas is very high, in some instances being above the speed of sound; and the high temperatures which are involved (particularly in the case of reactors for producing carbon black of small particle size) tremendously reduce the period of utility of the costly refractory of the furnace or reactor.

Among the objects of the present invention is the provision of an improved apparatus for making carbon black of high quality at a materially reduced production cost.

Another object is to provide an apparatus for attaining the foregoing objectives which is comparatively simple and inexpensive to install, operate and maintain.

More specifically, the teachings of the present invention contemplate a cylindrical furnace, or reactor, which eliminates the usual refractory lining, and which provides the following advantages:

(1) Being made practically entirely of metal, and involving no heavy fire brick, castable refractory walls or lining, the reactor of the present invention is relatively light and easy to move; and its cost is much lower (for example, only 10 percent to 25 percent of the cost of refractory reactors of the same production capacity).

(2) The metallic reactor of the present invention provides a jacket wall with the combustion air moving through the jacket (before combustion) which cools the inner wall and keeps it below its melting and scaling point. At the same time, the cooling air (for later combustion) is preheated, thereby allowing higher oil feed rates and resulting in higher yields.

(3) A maximum of preheating is obtainable with a minimum of surface area because no quench is used before the heat exchange; and a maximum of temperature differential is possible. This is also assisted by countercurrent flow.

(4) The use of air cooling of the hot effluent gases greatly reduces the amount of quench water necessary which:

(a) Reduces the size requirements of the carbon black collecting system;

(b) Reduces the size of the induced draft fan and the power requirements; and (c) Lowers the dew point of the effluent gases and cuts the corrosion rate of the effluent gas handling equipment.

(5) The preheated air helps to stabilize and increase the combustion and cracking rate.

The invention, then, comprises the features hereinafter fully described and as particularly pointed out in the claims, the following description and the annexed drawings setting forth in detail certain illustrative embodiments of the invention, these being indicative of but several of a number of ways in which the principles of the invention may be employed.

In said drawings:

Figure 1 is a fragmentary elevational view, partly in section, illustrating one form of apparatus which embodies the teachings of the present invention;

Figure 2 is a pattern layout on an enlarged scale for an element of the apparatus of Figure 1 which will be later described in detail;

Figure 3 is an enlarged fragmentary sectional view on the line 3—3 of Figure 1;

Figure 4 is a fragmentary elevational view, partly in section, and illustrating in greater detail the burner of the apparatus of Figure 1;

Figure 7 is another view which is generally similar to that of Figure 1 and illustrating another modification;

Figure 8:
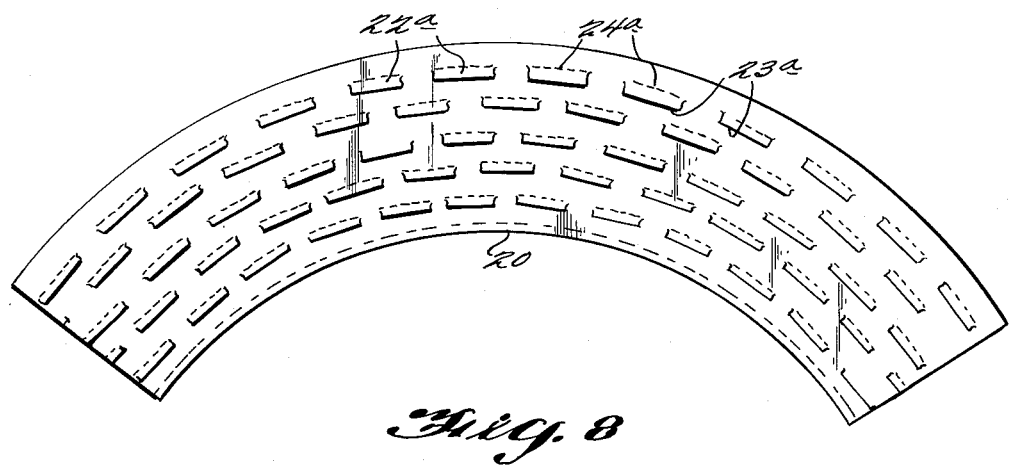

Figure 8 is a pattern layout on an enlarged scale for an element of the apparatus of Figure 7; and Figures 9, 10 and 11 are sectional views taken on the lines 9—9, 10—10 and 11—11, respectively, of Figure 7.

Referring more particularly to the drawings, the numeral 2 designates an elongate metallic housing or shell which comprises the outer jacket of the apparatus of the present invention within which there is concentrically disposed an elongate inner metallic tube 4 which serves as the main body portion of the reactor or furnace.

As a specific example, the outer housing or shell 2 may take the form of standard eighteen-inch (inside diameter) steel pipe with the inner tube 4 being eight inches in inside diameter.

Referring to the left-hand end of Figure 1, the adjacent end of the inner tube 4 terminates short of the corresponding end of the outer shell 2, thereby providing an unobstructed cylindrical chamber 5, the function of which will be described hereinafter.

Atmospheric air enters a tangential air inlet 6 at the right-hand end of the outer shell 2 (as viewed in Figure 1) to be circulated between it and the inner tube 4 for purposes stated earlier herein. This tangential air inlet 6 may acceptably take the form of a rectangular three-inch by twelve-inch slot.

Referring still to Figure 1, the outer surface of the inner tube 4 is provided with helical fins 7 which may, in the illustrative embodiment herein, be approximately one (1) inch in height, have a pitch of one (1) foot and be spaced approximately one-quarter (¼) inch apart.

Disposed between the radial outer edges of the helical fins 7 and the inner surface of the outer shell 2 is a series of four (4) helically shaped air-turning vanes 10, 11, 12 and 13, the same being spaced apart ninety degrees (90°), starting adjacent the tangential air inlet 6 and causing the flow of incoming air to be divided into four (4) quadrants. In the example shown and described, these helically shaped air-turning vanes 10, 11, 12 and 13 may have a pitch of one (1) foot (in the manner of the aforementioned helical fins) which causes the incoming air to make one complete revolution in the space between the outer shell 2 and the inner tube 4 for each foot of length thereof.

In effect, the air-turning vanes 10, 11, 12 and 13 constitute extensions of the helical fins 7, filling the space between them and the inner surface of the outer shell 2.

The apparatus specifically described hereinbefore is particularly adapted to make carbon black whose particle size is in the same range as currently produced HAF and ISAF black. As the air enters the tangential air inlet 6, helical movement is imparted to it by the aforementioned helical passageway defined by the helical fins 7 and the four (4) helically shaped air-turning vanes 10, 11, 12 and 13. This helical motion of the air traveling over the sharp edges of the helical fins 7 at high velocity causes highly turbulent flow, tending to reduce the air film thickness and increasing the heat transfer from the fins. Any convenient means may be used for securing the helical fins 7 and helically shaped air-turning vanes 10, 11, 12 and 13; such as welding.

The combustion air, after passing the length of the helicoid passageway between the outer shell 2 and the inner tube 4, enters the cylindrical chamber 5.

It will be noted that Figure 1 is divided into three (3) sections from right to left, being identified as B, C and D. Section B shows the outside of the outer shell 2; Section C the outside of the inner tube 4 with helical fins 7 and the helically shaped air-turning vanes 10, 11, 12 and 13; and Section D is a sectional view through both the inner tube 4 and the outer shell 2, as well as certain other elements which will shortly be described.

It is well known in the art of carbon black manufacture that most grit particles in the product carbon black are usually hard coke particles. It is further known that these coke particles are formed by oil drops or other hydrocarbons coming in contact with the walls of the reactor before the hydrocarbon is fully cracked to carbon black and hydrogen. The oil drops impinging on the walls of the reactor form coke deposits that break off and contribute to the grit content in the carbon black. The grit eliminators shown in the drawings and to be described hereinafter are so designed that they direct a portion of the jacket air in a relatively high velocity annular ring along the inner surface of the fintube and this helps to prevent uncracked oil droplets from impinging on the inner surface of the fintube.

Disposed within the cylindrical chamber 5 is a grit eliminator, generally indicated at 20, the same being a metallic frusto-cone with its smaller end suitably connected to the adjacent end of the inner tube 4, as by welding.

The grit eliminator 20 may be fabricated from a suitable metal, such as 22 gage No. 309 stainless steel; and the main body portion thereof is provided with a plurality of rows of louvers 22. In Figure 1, these louvers 22 are shown as being in a double row and extending at approximate right-angles to the helical flow of the air moving between the outer shell 2 and the inner tube 4; and they may acceptably be approximately two (2) inches long by one-quarter (¼) inch wide for an installation of the size generally described herein.

In Figure 3 of the drawings, there is shown a pattern layout of the grit eliminator of Figure 1.

Each one of the louvers 22 may be made by cutting on solid lines 23 and bending at a forty-five degree (45°) angle along the dotted lines 24, after which the sheet can be rolled into the form of a frustrum. The manner in which the louvers 22 scoop air into the inside of the grit collector 20 is illustrated by the arrow 30 in Figure 3.

Within the cylindrical compartment 5, and in axial alignment with the grit eliminator 20, is a horizontally disposed heat shield 32 which may be acceptably fabricated from 10 gage, No. 309 stainless steel. This horizontally disposed heat shield 32 is generally cup-shaped to provide an annular rim which is concentric with the outer shell 2 together with an outer end wall which has a sizeable central opening; and it is suitably supported by the adjacent closure 33 of the outer shell. This heat shield 32 serves to shield the front end closure 33 of the apparatus from flame radiation.

Referring particularly to Figure 4, the burner of the apparatus of the invention is shown as comprising a tube 40 which extends through a packing gland 41 in the center of the end closure 33, through the central opening in the heat shield 32, and axially into the cylindrical compartment 5 of the outer shell 2.

A tube 42 is disposed concentrically in the tube 40 and extends equi-distantly into the cylindrical compartment 5, the ends of said tubes being welded to a vertically disposed and centrally apertured plate or disk 44.

As shown, the diameter of the plate or disk 44 is considerably greater than the outside diameter of the tube 40; and the diameter of its central aperture is substantially that of the inside diameter of the tube 42.

Immediately behind the plate or disk 44, the tube 40 is provided with a series of evenly spaced apertures 45.

The outer end of the tube 42 extends beyond the tube 40; and the space therebetween is sealed by a closure plate 47.

The outer extremity of the tube 42 is connected to a T-connector 49, which, through a short section of tubing 50, communicates with one side of a valve 51, the other side of said valve carrying a packing gland 52.

An inlet connection 54 communicates with the chamber defined by the tubes 40 and 42 and the disk 44 and the closure plate 47; and, through it, combustion gas is supplied to the series of apertures 45.

An oil pipe 56 is disposed within the tube 40, being centered by spacers 57, and terminates in a spray head 58, the outer end of which is flush with the outer face of the disk 44. This oil pipe 56 extends successively through the T-connector 49, short tubing section 50, valve 51 and packing gland 52, and is connected to a suitable oil supply which constitutes the carbon black feedstock.

Axial air is supplied to the interior of the (inner) tube 42 through the branch of the T-connector 49; and it enters the combustion zone of the furnace of reactor on the downstream side of the centrally apertured disk 44 where it forms a concentrated stream on the oil spray (feedstock) emanating from the spray head 58 to direct the spray down the center of the grit eliminator 20 and the inner tube 4.

Preferably, the end closure 33 of the outer shell 2 is so constructed as to be quickly removable, whereby the entire burner may be readily withdrawn for servicing, etc.

In addition, the installation of the oil pipe 56 in the manner described permits the removal and servicing of the spray head 58 while the gas is being burned on the heating load. That is, the oil pipe 56 is withdrawn until the spray head 58 is outside of the valve 51 which is then closed to prevent axial air from escaping, after which the spray head and packing gland 52 are removed.

A sight glass tube 60 may be provided in the end closure 33, the same being in alignment with a view slot 61 in the centrally apertured end wall of the heat shield 32, thereby permitting observation of the end of the burner and the entrance opening of the grit eliminator 20. In addition, the end closure 33 of the outer shell may be provided with a pair of sight glass assemblies, one for providing an angle view of the end of the burner, and the other for enabling an axial view down the inner tube 4, as shown at 63.

Although neither shown nor further described herein, it will be understood by those skilled in the art that the inner tube 2 is provided with the customary radial spray port through which there extends a water pipe which terminates adjacent the centerline of the reaction chamber and carries a spray head from which the necessary quenching spray is delivered in order to stop the cracking action.

The carbon black produced in the reactor is removed from the effluent gases by means of any of the collecting devices which are well known in the art; and the effluent gases are discharged to the atmosphere.

In Figure 7 of the drawings, there is shown a modification of the present invention which contemplates longitudinal flow of the incoming air between the outer shell 2 and the inner tube 4. According to this embodiment, the outer surface of the inner tube 4 is provided with a series of relatively narrow, longitudinally and radially extending, fins 70 and four (4) longitudinally and radially extending vanes 74 which tend to straighten out the air flowing between the outer shell 2 and the inner tube 4. These vanes 74 are spaced approximately ninety degrees (90°) apart and, in effect, form extensions to the inner surface of the outer shell 2 of those longitudinally and radially extending fins 70 on the periphery of the inner tube 4 which occupy the same quadrantal positions.

The fins 70 extend throughout the length of the inner tube 4, the air-flow straightening vanes 74 being coextensive therewith except for that area of the inner tube which receives air from the tangential air inlet 6.

This construction and arrangement of elements permits the air in the jacket to circulate around the annular space between the outer shell 2 and inner tube 4, and then distribute itself equally between the four (4) equally spaced quadrantally disposed air-flow straightening vanes 74. Two types of air-deflector vanes 80 and 81 are illustrated in Figures 10 and 11, being alternately used for each foot throughout the length of the inner tube 4. The deflector vane 80 (Figure 10) deflects the cool layer of air traveling along the inner surface of the outer shell 2 toward the center. Then the next deflector vane 81 (Figure 11) scoops the cooler air down between the fins 7. In effect, these vanes cause the air to travel a zig-zag path between the outer shell 2 and the inner tube 4, keeping the air temperature more uniform, and thus assisting in keeping the inner tube 4 cooler. The deflector vanes 80 and 81 are welded between the air-flow straightening vanes 74 for easy installation in the outer shell 2.

Figure 5:
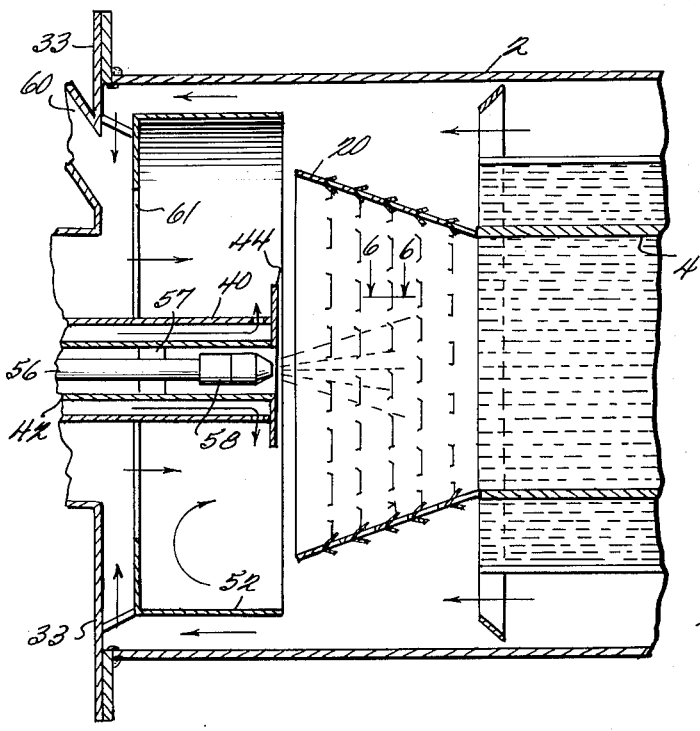
Figure 5 is a view generally similar to that of Figure 1, but illustrating a modified form of the apparatus of the invention.
Figure 6:
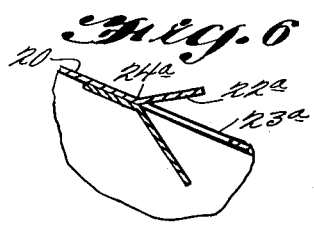
Figure 6 is an enlarged fragmentary detail view taken on the line 6—6 of Figure 5.

In Figure 5 of the drawings, there is illustrated the longitudinal air-flow arrangement of Figure 7, but with the addition of grit eliminator 20 and heat shield 52. The pattern layout for this particular grit eliminator is illustrated in Figure 8. It will be observed that the louver arrangement of Figures 5 and 8 is the same as that of Figures 1 and 2, except that the louver elements 22a are arranged in concentric rings at right-angles to the longitudinal direction of the movement of the air.

It is generally accepted in the art that feed-stock impingement on the carbon black reactor walls is the main cause of coke and grit formation. Accordingly, it is the purpose of the grit eliminator 20 to introduce a cool annular layer of air around the inside of the inlet end of the inner tube 4 to help keep it cool and prevent drops of oil from impinging on it before they are completely cracked.

The present application, while similar in some respects to applicants' patent application Serial No. 787,210, embodies certain additional, or alternate, features of construction, including the aforementioned grid eliminator 20, deflector vanes 80 and 81 which affect the direction of the counter-currently flowing air ultimately toward the elongate metallic tubular reactor and the elongate metallic tubular housing, heat shield 32 which serves to shield the front end closure of the apparatus from flame radiation, the quadrantally disposed air flow straightening vanes 74, etc.

While we have shown and described certain specific embodiments of the present invention, it will be readily understood by those skilled in the art that we do not wish to be limited exactly thereto, since various modifications may be made without departing from the scope of the invention as defined in the appended claims.

We claim:

1. In an apparatus for making carbon black, an elongate metallic tubular housing, an elongate metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate metallic tubular housing and communicating with said air jacket, a gas burner disposed in said unobstructed chamber and in axial alignment with said elongate metallic tubular reactor, means for supplying liquid carbon black feedstock to the flame produced by said gas burner, a flared extension on the upstream end of said elongate metallic tubular reactor and in axial alignment with said gas burner, said flared extension being provided with a series of louvers for receiving air from said air jacket, and a series of heat-transfer fins on the outer surface of said elongate metallic tubular reactor, said heat-transfer fins being adapted to guide the air from said air inlet toward the upstream end of said elongate metallic tubular reactor.

2. In an apparatus for making carbon black, an elongate metallic tubular housing, an elongate metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate metallic tubular housing and communicating with said air jacket, a gas burner disposed in said unobstructed chamber and in axial alignment with said elongate metallic tubular reactor, means for supplying liquid carbon black feedstock to the flame produced by said gas burner, a flared extension on the upstream end of said elongate metallic tubular reactor and in axial alignment with said gas burner, said flared extension being provided with a series of louvers for receiving air from said air jacket, and a series of longitudinally extending heat-treasfer fins on the outer surface of said elongate metallic tubular reactor.

3. In an apparatus for making carbon black, an elongate metallic tubular housing, an elongate metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate metallic tubular housing and communicating with said air jacket, a gas burner disposed in said unobstructed chamber and in axial alignment with said elongate metallic tubular reactor, means for supplying liquid carbon black feedstock to the flame produced by said gas burner, a flared extension on the upstream end of said elongate metallic tubular reactor and in axial alignment with said gas burner, said flared extension being provided with a series of louvers for receiving air from said air jacket, and a series of helical heat-transfer fins on the outer surface of said elongate metallic tubular reactor.

4. In an apparatus for making carbon black, an elongate metallic tubular housing, an elongate metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate metallic tubular housing and communicating with said air jacket, a gas burner disposed in said unobstructed chamber and in axial alignment with said elongate metallic tubular reactor, means for supplying liquid carbon black feedstock to the flame produced by said gas burner, a flared extension on the upstream end of said elongate metallic tubular reactor and in axial alignment with said gas burner, said flared extension being provided with a series of peripherally extending louvers for receiving air from said air jacket, and a series of heat-transfer fins on the outer surface of said elongate metallic tubular reactor, said heat-transfer fins being adapted to guide the air from said air inlet toward the upstream end of said elongate metallic tubular reactor.

5. In an apparatus for making carbon black, an elongate metallic tubular housing, an elongate metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate metallic tubular housing and communicating with said air jacket, a gas burner disposed in said unobstructed chamber and in axial alignment with said elongate metallic tubular reactor, means for supplying liquid carbon black feedstock to the flame produced by said gas burner, a flared extension on the upstream end of said elongate metallic tubular reactor and in axial alignment with said gas burner, said flared extension being provided with a series of obliquely extending louvers for receiving air from said air jacket, and a series of heat-transfer fins on the outer surface of said elongate metallic tubular reactor, said heat-transfer fins being adapted to guide the air from said air inlet toward the upstream end of said elongate metallic tubular reactor.

6. In an apparatus for making carbon black, an elongate metallic tubular housing, an elongate metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate metallic tubular housing and communicating with said air jacket, a gas burner disposed in said unobstructed chamber and in axial alignment with said elongate metallic tubular reactor, means for supplying liquid carbon black feedstock to the flame produced by said gas burner, a series of heat-transfer fins on the outer surface of said elongate metallic tubular reactor, said heat-transfer fins being adapted to guide the air from said air inlet toward the upstream end of said elongate metallic tubular reactor, and baffles for deflecting the air moving from said air inlet alternately toward the exterior surface of said elongate metallic tubular reactor and the interior surface of said elongate metallic tubular housing.

7. In an apparatus for making carbon black, an elongate metallic tubular housing, an elongate metallic tubular reactor disposed within and axially of said elongate metallic tubular housing and providing an air jacket therebetween, one end of said elongate metallic tubular housing extending beyond the corresponding end of said elongate metallic tubular reactor and providing an unobstructed chamber therein, a closure member for the aforementioned end of said elongate metallic tubular housing, an air inlet disposed adjacent the other end of said elongate metallic tubular housing and communicating with said air jacket, a gas burner disposed in said unobstructed chamber and in axial alignment with said elongate metallic tubular reactor, means for supplying liquid carbon black feedstock to the flame produced by said gas burner, a series of heat-transfer fins on the outer surface of said elongate metallic tubular reactor said heat-transfer fins being adapted to guide the air from said air inlet toward the upstream end of said elongate metallic tubular reactor, a flared extension on the upstream end of said elongate metallic tubular reactor and in axial alignment with said gas burner, and baffles for deflecting the air moving from said air inlet alternately toward the exterior surface of said elongate metallic tubular reactor and the interior surface of said elongate metallic tubular housing.

References Cited in the file of this patent
UNITED STATES PATENTS

| | | |
|---|---|---|
| Re. 22,886 | Ayers | June 3, 1947 |
| 2,498,444 | Orr | Feb. 21, 1950 |
| 2,756,032 | Dowell | July 24, 1956 |
| 2,785,054 | Bethea et al. | Mar. 12, 1957 |
| 2,924,512 | Webster | Feb. 9, 1960 |

FOREIGN PATENTS

| | | |
|---|---|---|
| 547,324 | Canada | Oct. 8, 1957 |